United States Patent
Wu et al.

(10) Patent No.: US 10,901,935 B2
(45) Date of Patent: Jan. 26, 2021

(54) IC, BUS SYSTEM AND CONTROL METHOD THEREOF

(71) Applicant: Nuvoton Technology Corporation, Hsinchu (TW)

(72) Inventors: Ming-Hung Wu, Jhubei (TW); Chih-Hung Huang, New Taipei (TW); Chun-Wei Chiu, New Taipei (TW)

(73) Assignee: Nuvoton Technology Corporation, Hsinchu Science Park (TW)

( * ) Notice: Subject to any disclaimer, the term of this patent is extended or adjusted under 35 U.S.C. 154(b) by 0 days.

(21) Appl. No.: 16/593,202

(22) Filed: Oct. 4, 2019

(65) Prior Publication Data
US 2020/0117634 A1 Apr. 16, 2020

(30) Foreign Application Priority Data
Oct. 15, 2018 (TW) .............................. 107136211 A

(51) Int. Cl.
*G06F 13/42* (2006.01)
*G06F 13/40* (2006.01)

(52) U.S. Cl.
CPC ...... *G06F 13/4286* (2013.01); *G06F 13/4072* (2013.01)

(58) Field of Classification Search
CPC ............. G06F 13/4072; G06F 13/4286; G06F 13/4282
USPC ........................................................ 710/110
See application file for complete search history.

(56) References Cited

U.S. PATENT DOCUMENTS

| 5,928,345 A * | 7/1999 | Tetzlaff | G05B 15/02 340/3.5 |
| 7,752,365 B2 * | 7/2010 | Taylor | G06F 13/24 710/105 |
| 9,015,394 B2 * | 4/2015 | DeCesaris | G06F 13/4282 341/164 |

(Continued)

FOREIGN PATENT DOCUMENTS

| TW | 531985 B | 5/2003 |
| TW | I347516 B | 8/2011 |

(Continued)

OTHER PUBLICATIONS

Taiwanese Office Action and Search Report which corresponds to Application No. 107136211; dated Dec. 25, 2019.

*Primary Examiner* — Brian T Misiura
(74) *Attorney, Agent, or Firm* — Muncy, Geissler, Olds & Lowe, P.C.

(57) ABSTRACT

An integrated circuit (IC) is provided. The IC includes a specific pin, a pull-down circuit and a voltage detector coupled to the specific pin, and a controller. The pull-down circuit includes a pull-down resistor corresponding to a driving voltage level, and is configured to selectively couple the pull-down resistor to the specific pin according to a control signal. The voltage detector is configured to detect the specific pin to obtain a detected voltage value. The controller is configured to determine whether the detected voltage value is the same as the driving voltage level, so as to provide the control signal. When the detected voltage value is greater or less than the driving voltage level, the controller is configured to provide the control signal to the pull-down circuit, so that the pull-down resistor is electrically separated from the specific pin.

7 Claims, 5 Drawing Sheets

(56) References Cited

U.S. PATENT DOCUMENTS

| | | | |
|---|---|---|---|
| 10,120,829 B2* | 11/2018 | Cox | G06F 13/362 |
| 10,606,778 B2* | 3/2020 | Chiu | G06F 13/404 |
| 2011/0029705 A1* | 2/2011 | Evans | G06F 13/4291 |
| | | | 710/110 |
| 2019/0361832 A1* | 11/2019 | Huang | G06F 13/4282 |
| 2019/0361833 A1* | 11/2019 | Huang | G06F 13/3625 |
| 2020/0065280 A1* | 2/2020 | Huang | G06F 13/362 |

FOREIGN PATENT DOCUMENTS

| | | |
|---|---|---|
| TW | I508096 B | 11/2015 |
| TW | 201817168 A | 5/2018 |

* cited by examiner

IC, BUS SYSTEM AND CONTROL METHOD THEREOF

CROSS REFERENCE TO RELATED APPLICATIONS

This application claims priority of Taiwan Patent Application No. 107136211, filed on Oct. 15, 2018, the entirety of which is incorporated by reference herein.

BACKGROUND OF THE INVENTION

Field of the Invention

The invention relates to a bus system, and more particularly to a bus system with a plurality of slave devices.

Description of the Related Art

In a conventional computer system, a chip set such as a south bridge chip is electrically connected to another external circuit module (such as a system-on-a-chip (SoC) with various functions) through a low pin count (LPC) interface. The external circuit modules coupled through the LPC interface are respectively assigned to different independent addresses. As a result, the south bridge chip can communicate with the external circuit modules using one-to-many communication. However, in recent years, new bus architectures, such as an enhanced serial peripheral interface (eSPI) bus, began only allowing a one-to-one communication mechanism to be employed between a chip set and the external circuit modules.

BRIEF SUMMARY OF THE INVENTION

ICs, Bus systems and a control method thereof are provided. An embodiment of an IC provided. The IC includes a specific pin, a pull-down circuit coupled to the specific pin, a voltage detector coupled to the specific pin, and a controller. The pull-down circuit includes a pull-down resistor corresponding to a driving voltage level and is configured to selectively couple the pull-down resistor to the specific pin according to a control signal. The voltage detector is configured to detect the specific pin to obtain a detected voltage value. The controller is configured to determine whether the detected voltage value is the same as the driving voltage level, so as to provide the control signal. When the detected voltage value is greater or less than the driving voltage level, the controller is configured to provide the control signal to the pull-down circuit, so that the pull-down resistor is electrically separated from the specific pin.

Furthermore, an embodiment of a bus system is provided. The bus system includes a master device, an enhanced serial peripheral interface (eSPI) bus, a plurality of slave devices electrically connected to the master device through the eSPI bus. Each of the slave devices includes an alert handshake pin, a pull-down circuit coupled to the alert handshake pin, a voltage detector coupled to the alert handshake pin, and a controller. The pull-down circuit includes a pull-down resistor corresponding to a driving voltage level, and is configured to selectively couple the pull-down resistor to the alert handshake pin according to a control signal. The voltage detector is configured to detect the alert handshake pin to obtain a detected voltage value. The controller is configured to determine whether the detected voltage value is the same as the driving voltage level, so as to provide the control signal. In each of the slave devices, the alert handshake pin is electrically connected to the alert handshake pins of the other slave devices via an alert handshake control line, and the alert handshake control line is coupled to a power supply via a pull-up resistor. In the first slave device, when the detected voltage value is different than the driving voltage level, the controller is configured to determine that the pull-down resistor is coupled to the pull-down resistor of a second slave device via the alert handshake pin.

Moreover, an embodiment of a control method for controlling a first slave device of a plurality of slave devices in a bus system is provided. The bus system further includes a pull-up resistor and a master device electrically connected to the slave devices through an enhanced serial peripheral interface (eSPI) bus. A first alert handshake pin of the first slave device is coupled to a second alert handshake pin of a second slave device via an alert handshake control line, and the alert handshake control line is coupled to a power supply via a pull-up resistor. The alert handshake control line is detected to obtain a detected voltage value via the first alert handshake pin. In response to an alert request of the first slave device, a first pull-down resistor corresponding to a first driving voltage level in the first slave device is coupled to the first alert handshake pin when the detected voltage value is the same as a power voltage level of the power supply. The first pull-down resistor is electrically separated from the first alert handshake pin when the detected voltage value is greater or less than the first driving voltage level.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
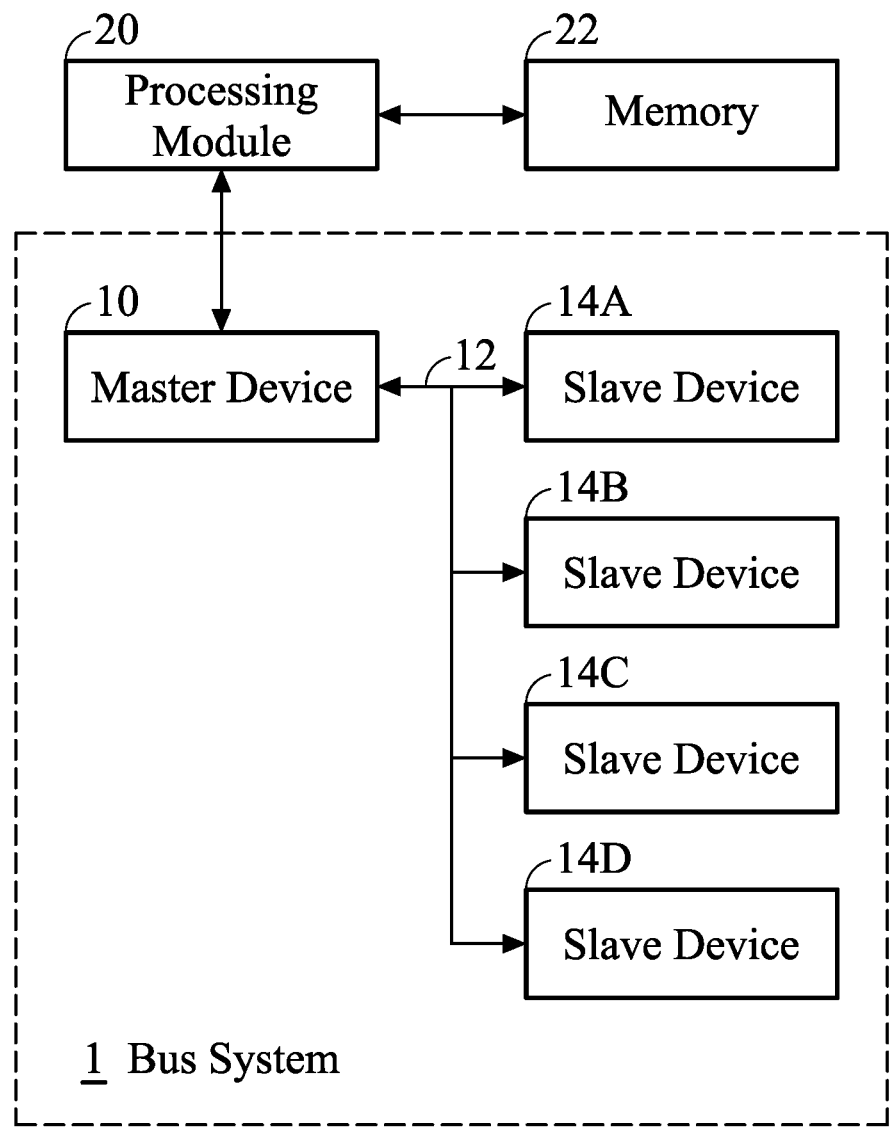
FIG. 1 shows a bus system according to an embodiment of the invention.

FIG. 1 shows a bus system 1 according to an embodiment of the invention. The bus system 1 includes a master device 10, a bus 12 and a plurality of slave devices 14A through 14D. In some embodiments, the master device 10 may be a south bridge chip, and the slave devices 14A through 14D are integrated circuits.

In some embodiments, the master device 10 is electrically connected to a processing module 20 of a computer system (not shown), so as to perform data access with the slave devices 14A through 14D via the bus 12 in response to the commands of the processing module 20. In some embodiments, the processing module 20 is electrically connected to a memory 22 of the computer system, so as to access the memory 22 according to the requests of different application programs.

In some embodiments, the bus 12 is an enhanced serial peripheral interface (eSPI) bus. In the bus system 1, the master device 10 is electrically connected to the slave devices 14A through 14D via the bus 12. Furthermore, the master device 10 communicates with the slave devices 14A through 14D by using a one-to-one communication mechanism, and the slave devices 14A through 14D communicate with the master device 10 by using an arbitration mechanism. It should be noted that the number of slave devices 14A through 14D as illustrated is used as an example, and not to limit the invention.

Figure 2:
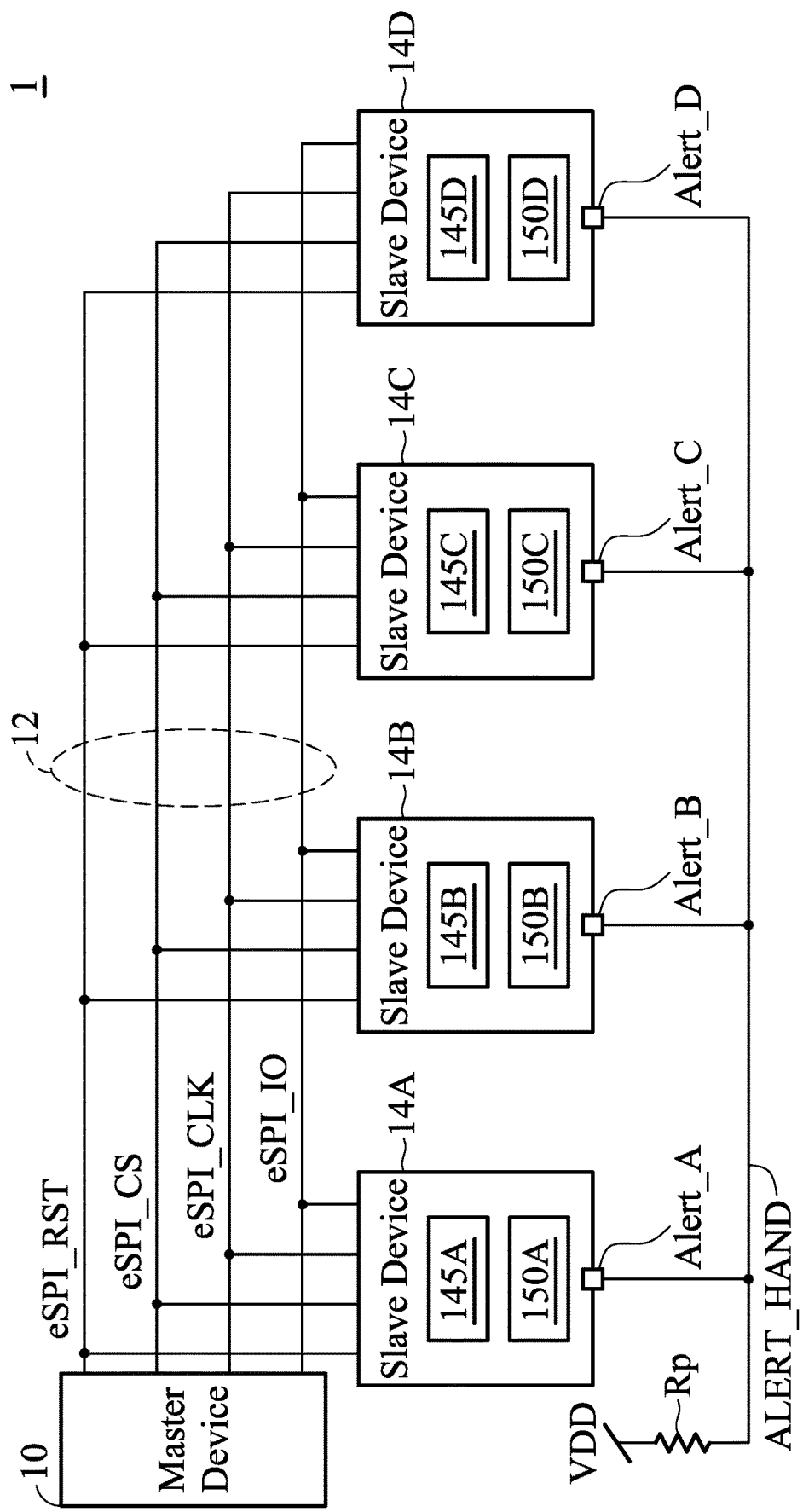
FIG. 2 shows the connection configuration of the bus system in FIG. 1 according to an embodiment of the invention.

FIG. 2 shows the connection configuration of the bus system 1 in FIG. 1 according to an embodiment of the invention. In the embodiment, the bus 12 includes a reset signal line eSPI_RST, a chip select signal line eSPI_CS, a clock signal eSPI_CLK and an input and output signal line eSPI_IO. The master device 10 selects one of the slave devices 14A through 14D by using the chip select signal line eSPI_CS to communicate using the one-to-one mechanism. Furthermore, the slave devices 14A through 14D communicate with the master device 10 (e.g., transmitting data and commands) through the input and output signal line eSPI_IO using the arbitration mechanism. When the master device 10 communicates with the slave devices 14A through 14D via the bus 12, the clock signal eSPI_CLK is used as a reference clock.

In general, according to the operation mechanism of the chip select signal line eSPI_CS, the master device 10 can only select one slave device for communication. However, in the bus system 1, only one of the slave devices 14A through 14D responds to the master device 10 at a time by using the arbitration mechanism. Therefore, when the master device 10 still operates with a one-to-one communication mechanism, the bus 12 can connect the slave devices 14A through 14D to perform communication tasks in response to the chip select signal line eSPI_CS, thereby increasing the expandability of the bus system 1.

In FIG. 2, the slave devices 14A through 14D include the alert handshake pins Alert_A through Alert_D. The alert handshake pins Alert_A through Alert_D of the slave devices 14A through 14D are electrically connected to the alert-handshake control line ALERT_HAND. In the embodiment, the alert-handshake control line ALERT_HAND is electrically connected to the power supply VDD through a resistor Rp, and the resistor Rp is a pull-up resistor, so that the voltage of the alert-handshake control line ALERT_HAND is substantially the same as the power voltage level of the power supply VDD. Furthermore, the controllers 145A through 145D within the slave devices 14A through 14D control the corresponding alert handshake pins Alert_A through Alert_D to individual drive voltages by using the pull-down circuits 150A through 150D, so as to drive the alert handshake control line ALERT_HAND. Thus, each of the slave devices 14A through 14D can obtain the right to actively communicate with the master device 10 by controlling the voltage level of the alert-handshake control line ALERT_HAND. Furthermore, the alert handshake pins Alert_A through Alert_D are the bi-directional input/output (bi-directional input/output) pins, and the alert handshake pins Alert_A through Alert_D are operating as an open drain in the output mode.

As described above, in the bus system 1, only one of the slave devices 14A through 14D communicates with the master device 10 at a time. Therefore, when the slave device 14A want to communicate with the master device 10, the controller 145A is configured to set the alert handshake pin Alert_A to the driving voltage level VD_A through the pull-down circuit 150A, so as to drive the alert-handshake control line ALERT_HAND. When the slave device 14B want to communicate with the master device 10, the controller 145B is configured to set the alert handshake pin Alert_B to the driving voltage level VD_B through the pull-down circuit 150B, so as to drive the alert-handshake control line ALERT_HAND. When the slave device 14C want to communicate with the master device 10, the controller 145C is configured to set the alert handshake pin Alert_C to the driving voltage level VD_C through the pull-down circuit 150C, so as to drive the alert-handshake control line ALERT_HAND. When the slave device 14D want to communicate with the master device 10, the controller 145D is configured to set the alert handshake pin Alert_D to the driving voltage level VD_D via the pull-down circuit 150D, so as to drive the alert-handshake control line ALERT_HAND. It should be noted that the slave devices 14A through 14D have different drive voltage levels VD_A through VD_D.

Figure 3:
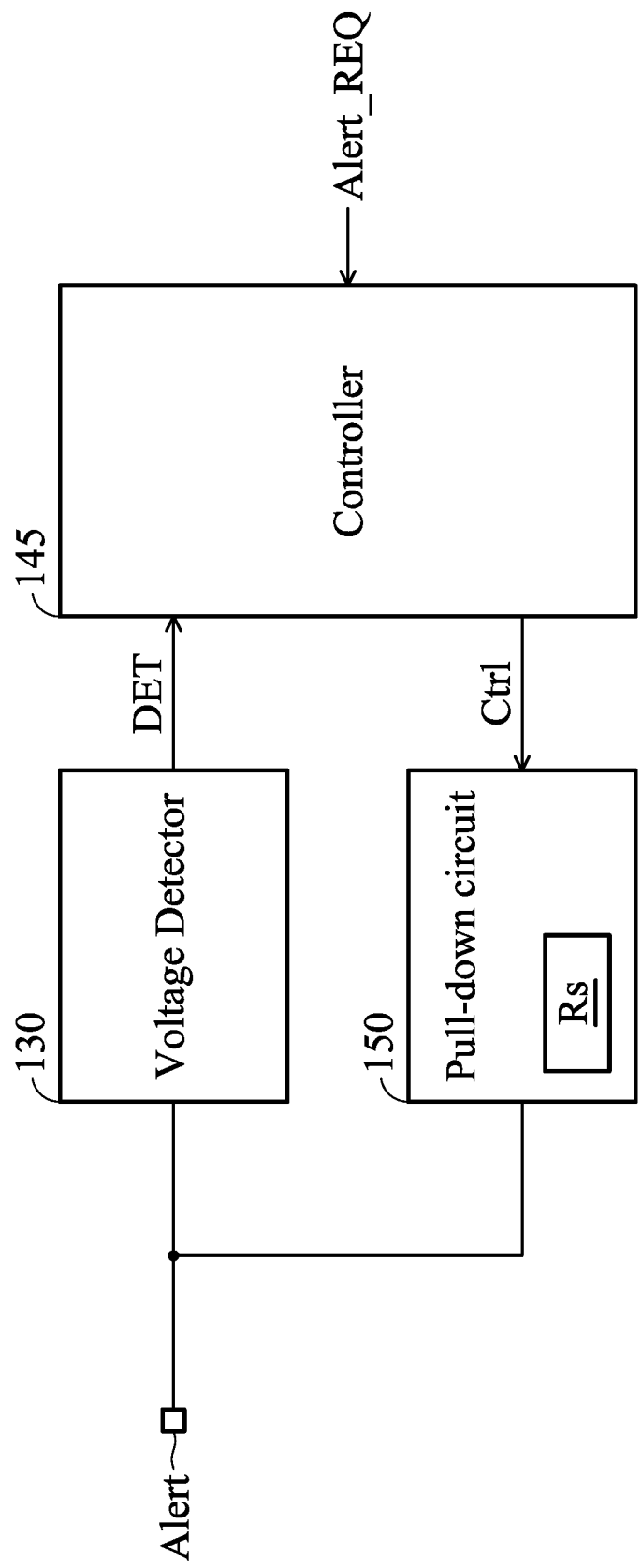
FIG. 3 shows the slave device according to an embodiment of the invention.

FIG. 3 shows the slave device 14 according to an embodiment of the invention. The slave device 14 includes an alert handshake pin Alert, a voltage detector 130, a controller 145, and a pull-down circuit 150. The voltage detector 130 and the pull-down circuit 150 are electrically connected to the alert handshake pin Alert. The pull-down circuit 150 includes a resistor Rs. In the embodiment, the resistor Rs is a pull-down resistor. The pull-down circuit 150 is configured to selectively couple the pull-down resistor Rs to the alert handshake pin Alert according to the control signal Ctrl. In addition, the resistance value of the pull-down resistor Rs is also set by the control signal Ctrl from the controller 145. As described above, the alert handshake pin Alert of each slave device 14 is electrically connected to the power supply VDD via the alert-handshake control line ALERT_HAND and the pull-up resistor Rp. Therefore, when the pull-down resistor Rs is coupled to the alert handshake pin Alert by the control signal Ctrl, the resistance ratio of the pull-up resistor Rp and the pull-down resistor Rs is controlled by adjusting the resistance value of the pull-down resistor Rs, so as to set the alert handshake Pin Alert to the dedicated drive voltage level VD. In some embodiments, the pull-down resistor Rs is formed by a plurality of resistors connected in series, and the pull-down resistor Rs is coupled between a switch (not shown) and a ground (not shown). It should be noted that the pull-down resistor Rs of each slave device 14 (e.g., the slave devices 14A through 14D of FIG. 2) has different resistance value. Therefore, when the pull-down resistor Rs of any slave device 14 is coupled to the alert-handshake control line ALERT_HAND via the alert handshake pin Alert, according to the voltage division result of the pull-up resistor Rp and the pull-down resistor Rs, the alert-handshake control line ALERT_HAND is set to a voltage value corresponding to the resistance ratio of the pull-up resistor Rp and the pull-down resistor Rs via the alert handshake pin Alert. For example, assuming the resistance ratio of the pull-up resistor Rp and the pull-down resistor Rs is 1:4 and the power voltage level of the power supply VDD is 5 volts, when the pull-down resistor Rs is electrically connected to the pull-up resistor Rp, the voltage of the alert-handshake control line ALERT_HAND is set at 4 volts according to the voltage division result.

In FIG. 3, the voltage detector 130 is configured to detect/measure the alert-handshake control line ALERT_HAND via the alert handshake pin Alert, so as to obtain the detected voltage value DET of the alert-handshake control line ALERT_HAND. In some embodiments, the voltage detector 130 includes one or more comparators for providing a detection voltage value DET having a plurality of bits. In some embodiments, the comparator of the voltage detector 130 may be a digital comparator or an analog comparator.

In the slave device 14, the controller 145 obtains information such as the driving voltage level VD of the slave device 14 with software or hardware manner. Based on the driving voltage level VD, the controller 145 is configured to provide the control signal Ctrl to the pull-down circuit 150, so as to adjust the resistance value of the pull-down resistor Rs. Thus, when the control signal Ctrl controls the pull-down resistor Rs to be coupled to the alert handshake pin Alert, the pull-down circuit 150 is configured to adjust the resistance ratio of the pull-up resistor Rp and the pull-down resistor Rs, so as to set the alert handshake pin Alert at the driving voltage level VD.

In FIG. 3, the alert request Alert_REQ indicates that the slave device 14 want to communicate with the master device 10 of FIG. 2 (e.g., transmitting interrupt requests). Therefore, when the alert request Alert_REQ is received, the controller 145 is configured to detect/measure the alert handshake pin Alert through the voltage detector 130, so as to obtain the detected voltage value DET of the alert-handshake control line ALERT_HAND. Next, the controller 145 is configured to determine whether the alert-handshake control line ALERT_HAND is driven by the other slave devices according to the detected voltage value DET. For example, when the detected voltage value DET of the alert-handshake control line ALERT_HAND is less than the power voltage level of the power supply VDD, the controller 145 is configured to determine that the alert-handshake control line ALERT_HAND has been driven by the other slave device 14. Conversely, when the detected voltage value DET of the alert-handshake control line ALERT_HAND is substantially the same as the power voltage level of the power supply VDD, the controller 145 is configured to determine that the alert-handshake control line ALERT_HAND is not driven by the other slave device 14. After determining that the alert-handshake control line ALERT_HAND has not driven by the other slave device 14, the controller 145 provides the control signal Ctrl to the pull-down circuit 150, so as to enable the pull-down circuit 150. Thus, the pull-down resistor Rs having a resistance value corresponding to the driving voltage level VD is electrically connected to the alert handshake pin Alert. Next, the controller 145 is configured to control the voltage detector 130 to continuously monitor the alert-handshake control line ALERT_HAND. When the voltage of the alert-handshake control line ALERT_HAND is stable or after a specific time interval (e.g., 0.1 microsecond), the controller 145 is configured to further determine whether the detected voltage value DET of the alert-handshake control line ALERT_HAND is the same as the dedicated driving voltage level VD. If the detected voltage value DET is the same as the driving voltage level VD, the controller 145 is configured to determine that the alert-handshake control line ALERT_HAND is not driven by the other slave device 14, and the slave device 14 can communicate with the master device 10 of FIG. 2 (e.g., performing interrupt requests). After completing communication with the master device 10, the controller 145 is configured to provide the control signal Ctrl to the pull-down circuit 150, so as to disable the pull-down circuit 150. Thus, the pull-down resistor Rs of the pull-down circuit 150 is electrically separated from the pull-up resistor Rp, and the alert-handshake control line ALERT_HAND is not driven by the slave device 14. Conversely, if the detected voltage value DET is different from the driving voltage level VD, the controller 145 is configured to determine that the alert-handshake control line ALERT_HAND is also driven by the other slave device 14. Therefore, according to the detected voltage value DET and the driving voltage level VD, the controller 145 is configured to determine whether to disable the pull-down circuit 150.

Figure 4:
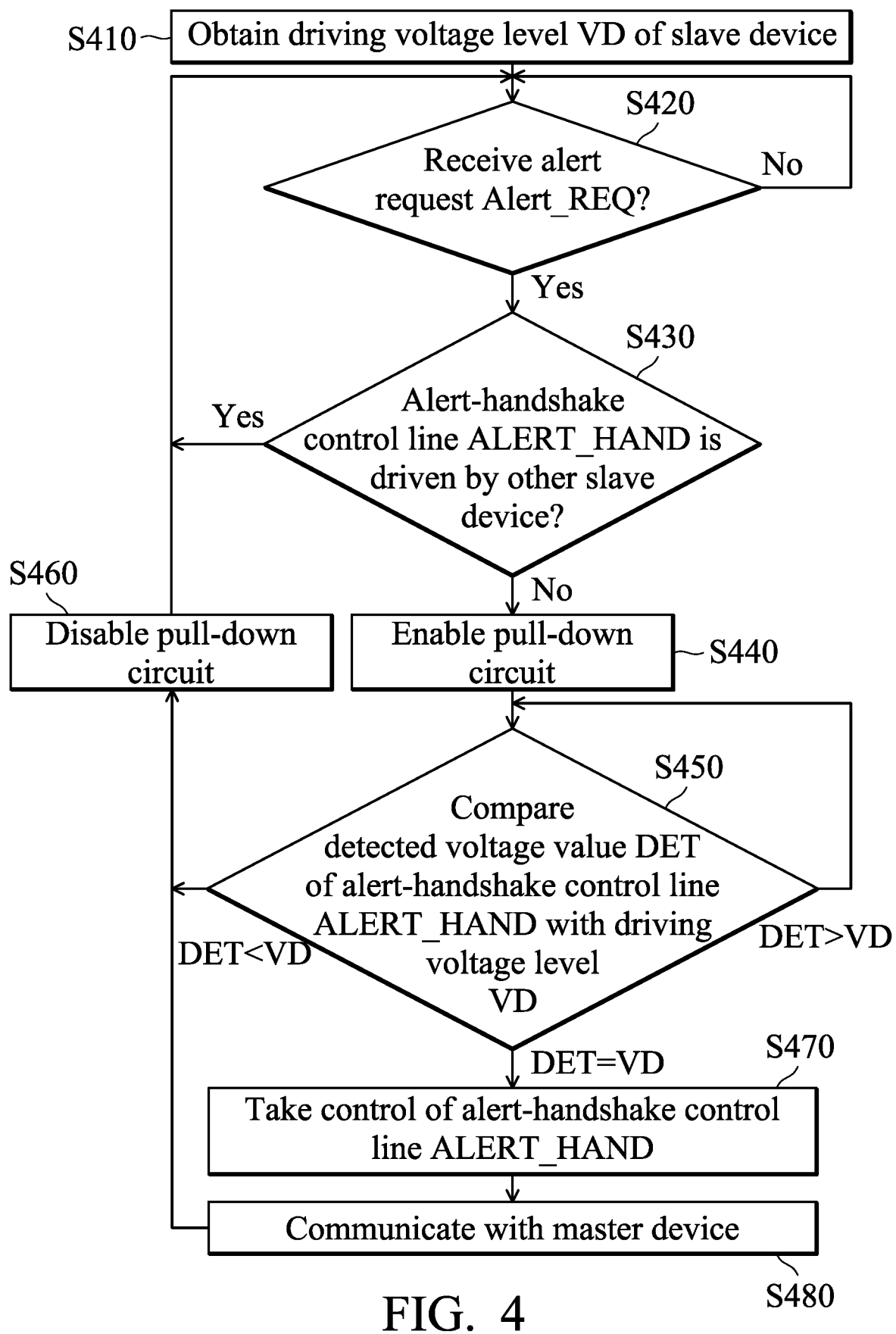
FIG. 4 shows a control method for controlling the slave devices in the bus system according to an embodiment of the invention.

FIG. 4 shows a control method for controlling the slave devices in the bus system according to an embodiment of the invention. The control method of FIG. 4 is performed by the controllers of the slave devices in the bus system, such as the controllers 145A through 145D of FIG. 2 or the controller 145 of FIG. 3.

The bus system 1 includes one or more of the slave devices 14. Furthermore, the alert handshake pin Alert of each slave device 14 is electrically connected to the alert-handshake control line ALERT_HAND. Furthermore, the alert-handshake control line ALERT_HAND is electrically connected to the power supply VDD via the pull-up resistor Rp. Moreover, each slave device 14 has a dedicated driving voltage level VD. In the bus system 1, the priority order for driving the alert-handshake control line ALERT_HAND is determined by the driving voltage level VD of each slave device 14. Furthermore, in the control method of FIG. 4, the slave device 14 with the smallest driving voltage level VD has the highest priority for driving the alert-handshake control line ALERT_HAND. Conversely, the slave device 14 with the largest drive voltage level VD has the lowest priority for driving the alert-handshake control line ALERT_HAND.

Referring to FIG. 3 and FIG. 4 together, in step S410, the controller 145 is configured to obtain the dedicated driving voltage level VD of the slave device 14 through software or hardware manner. In addition, according to the driving voltage level VD, the controller 145 is configured to provide the control signal Ctrl to the pull-down circuit 150, so as to adjust the resistance value of the pull-down resistor Rs according to the driving voltage level VD. Next, in step S420, the controller 145 is configured to determine whether an alert request Alert_REQ has been received. If not, the controller 145 continues to determine if the alert request Alert_REQ has been received.

After receiving the alert request Alert_REQ, the controller 145 is configured to detect/measure the alert handshake pin Alert via the voltage detector 130, so as to obtain the detected voltage value DET of the alert-handshake control line ALERT_HAND. According to the detected voltage value DET of the alert-handshake control line ALERT_HAND, the controller 145 is configured to determine whether the alert-handshake control line ALERT_HAND is driven by the other slave device 14 (step S430). As described above, when the detected voltage value DET of the alert-handshake control line ALERT_HAND is substantially the same as the power voltage level of the power supply VDD, the controller 145 is configured to determine that the alert-handshake control line ALERT_HAND is not driven by the other slave device. Conversely, when the detected voltage value DET of the alert-handshake control line ALER- T_HAND is less than the power voltage level of the power supply VDD, the controller 145 is configured to determine that the alert-handshake control line ALERT_HAND has been driven by the other slave device. Thus, the controller 145 continues to perform steps S420 and S430 until the controller 145 determines that the alert-handshake control line ALERT_HAND is not driven by the other slave device (i.e., the detected voltage value DET is substantially the same as the power voltage level of the power supply VDD).

After determining that the alert-handshake control line ALERT_HAND is not driven by the other slave device 14, the controller 145 is configured to provide the control signal Ctrl to the pull-down circuit 150, so as to enable the pull-down circuit 150 (step S440). Thus, the pull-down resistor Rs having a resistance value corresponding to the driving voltage level VD is electrically connected to the alert handshake pin Alert.

Next, the controller 145 is configured to continuously monitor the detected voltage value DET of the alert-handshake control line ALERT_HAND via the voltage detector 130. When the detection voltage value DET of the alert-handshake control line ALERT_HAND is stable or after a specific time interval (e.g., 0.1 microsecond), the controller 145 is configured to compare the detected voltage value DET of the alert-handshake control line ALERT_HAND with the driving voltage level VD (step S450). When the detected voltage value DET is less than the driving voltage level VD, the controller 145 is configured to determine that the alert-handshake control line ALERT_HAND is simultaneously driven by the other slave device 14 having higher priority. Thus, the controller 145 is configured to disable the pull-down circuit 150 (step S460), so as to electrically separate the pull-down resistor Rs of the pull-down circuit 150 from the pull-up resistor Rp, and then returns to step S420. Furthermore, when the detected voltage value DET is greater than the driving voltage level VD, the controller 145 is configured to determine that the alert-handshake control line ALERT_HAND is simultaneously driven by the other slave device 14 having lower priority. Thus, the controller 145 is configured to continuously enable the pull-down circuit 150, so that the pull-down resistor Rs of the pull-down circuit 150 is electrically connected to the pull-up resistor Rp, and then continuously monitor the detected voltage value DET of the alert-handshake control line ALERT_HAND until the other slave device 14 having lower priority electrically is configured to separate the internal pull-down resistor Rs of the pull-down circuit 150 from the resistor Rp, so that the detected voltage value DET of the alert-handshake control line ALERT_HAND is the same as the drive voltage level VD. Thus, the controller 145 is configured to determine that the alert-handshake control line ALERT_HAND is not driven by the other slave device, that is, the slave device 14 takes control of the alert-handshake control line ALERT_HAND (step S470). Next, in step S480, the slave device 14 communicates with the master device 10 of FIG. 2 (e.g., performing interrupt requests). After the communication is completed, the controller 145 disables the pull-down circuit 150 (step S460), so as to electrically separate the pull-down resistor Rs of the pull-down circuit 150 from the pull-up resistor Rp, and then returns to step S420.

In some embodiments, the slave device 14 having the largest driving voltage level VD has the highest priority to drive the alert-handshake control line ALERT_HAND, and the slave device 14 having the smallest driving voltage level VD has the lowest priority to drive the alert-handshake control line ALERT_HAND. Therefore, when the detected voltage value DET of the alert-handshake control line ALERT_HAND is greater than the corresponding driving voltage level VD, the controller 145 is configured to determine that the alert-handshake control line ALERT_HAND is simultaneously driven by the slave device having a higher priority. Thus, the controller 145 is configured to disable the pull-down circuit 150 (step S460), so as to electrically separate the pull-down resistor Rs of the pull-down circuit 150 from the pull-up resistor Rp. Conversely, when the detected voltage value DET is less than the driving voltage level VD, the controller 145 is configured to determine that the alert-handshake control line ALERT_HAND is simultaneously driven by the slave device having a lower priority. Therefore, the controller 145 is configured to continuously enable the pull-down circuit 150, so that the pull-down resistor Rs of the pull-down circuit 150 is electrically connected to the pull-up resistor Rp, and continuously monitor the detected voltage value DET of the alert-handshake control line ALERT_HAND until the other slave device 14 with the lower priority electrically separates the pull-down resistor Rs of the internal pull-down circuit 150 from the resistor Rp, so that the detected voltage value DET is the same as the corresponding driving voltage level VD. Thus, the controller 145 is configured to determine that the alert-handshake control line ALERT_HAND is not driven by the other slave device, and the slave device 14 can communicate with the master device 10 of FIG. 2 (e.g., performing interrupt requests).

Figure 5:
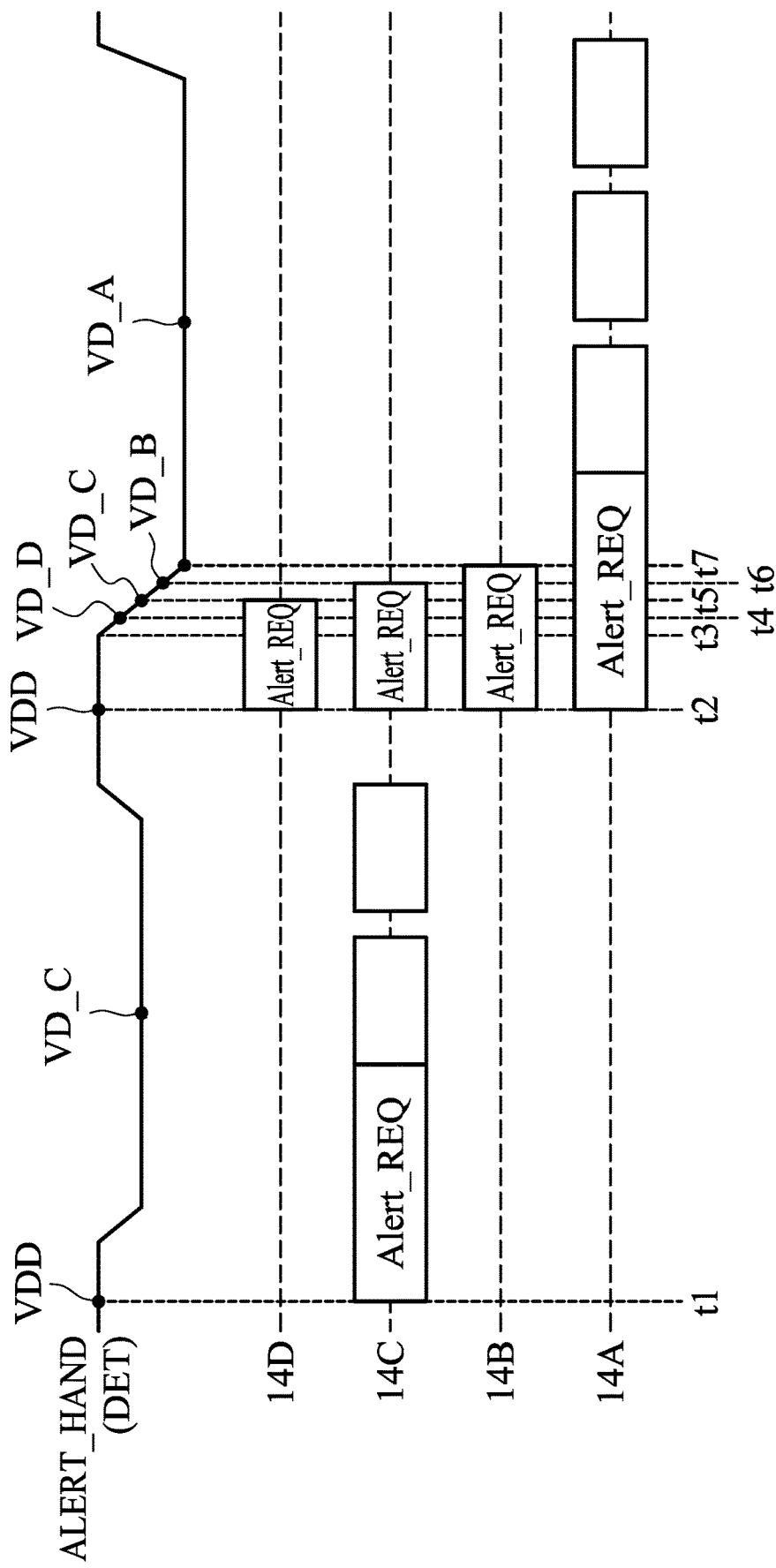
FIG. 5 is an exemplary waveform diagram of the alert-handshake control line ALERT_HAND for illustrating that the alert-handshake control line ALERT_HAND are driven by the slave devices of FIG. 2 according to the control method of FIG. 4.

FIG. 5 is an exemplary waveform diagram of the alert-handshake control line ALERT_HAND for illustrating that the alert-handshake control line ALERT_HAND are driven by the slave devices 14A through 14D of FIG. 2 according to the control method of FIG. 4. Referring to FIGS. 2 and 5 together, first, at time t1, the alert-handshake control line ALERT_HAND is maintained at the power voltage level of the power supply VDD, so the slave devices 14A through 14D are configured to determine that the alert-handshake control line ALERT_HAND is not driven by any of the slave devices 14A through 14D. Next, the slave device 14C is configured to enable the pull-down circuit 150C in response to its alert request Alert_REQ, so as to set the alert handshake pin Alert_C at the drive voltage level VD_C. Thus, the slave device 14C takes control of the alert-handshake control line ALERT_HAND to communicate with the master device 10 (e.g., performing interrupt requests). After completing communication with the master device 10, the slave device 14C is configured to disable the pull-down circuit 150C. Thus, the alert-handshake control line ALERT_HAND rises from the drive voltage level VD_C to the power voltage level of the power supply VDD.

At time t2, the alert-handshake control line ALERT_HAND is maintained at the power voltage level of the power supply VDD, so the slave devices 14A through 14D are configured to determine that the alert-handshake control line ALERT_HAND is not driven by any of the slave devices 14A through 14D. Next, the alert requests Alert_REQ of the slave devices 14A through 14D are present. Thus, the pull-down circuits 150A through 150D are enabled by the slave devices 14A through 14D, respectively, and the alert-handshake control line ALERT_HAND falls from the power voltage level of the power supply VDD (at time point t3). In the embodiment, the slave device 14A having the smallest driving voltage level VD_A will have the highest priority for driving the alert-handshake control line ALERT_HAND, and the slave device 14D having the largest driving voltage level VD_D will has the lowest priority for driving the alert-handshake control line ALERT_HAND, where VD_A<VD_B<VD_C<VD_D<VDD.

After the time point t3, since the pull-down resistors Rs of the slave devices 14A through 14D are all coupled to the pull-up resistor Rp, the voltage of the alert-handshake control line ALERT_HAND is affected and continues to decrease by four different resistance values of the pull-down resistors Rs coupled in parallel. At time t4, for the slave device 14D, when the detection voltage value DET of the alert-handshake control line ALERT_HAND is less than the driving voltage level VD_D, the controller 145D is configured to determine that the alert-handshake control line ALERT_HAND is simultaneously driven by the other slave device 14A, 14B or 14C with higher priority. Thus, the controller 145D is configured to disable the pull-down circuit 150D, so as to electrically separate the pull-down resistor Rs of the pull-down circuit 150D from the pull-up resistor Rp.

At time t5, for the slave device 14C, when the detected voltage value DET of the alert-handshake control line ALERT_HAND is less than the driving voltage level VD_C, the controller 145C is configured to determine that the alert-handshake control line ALERT_HAND is simultaneously driven by the other slave device 14A or 14B with higher priority. Thus, the controller 145C is configured to disable the pull-down circuit 150C, so as to electrically separate the pull-down resistor Rs of the pull-down circuit 150C from the pull-up resistor Rp.

At time t6, for the slave devices 14B, when the detected voltage value DET of the alert-handshake control line ALERT_HAND is less than the driving voltage level VD_B, the controller 145B is configured to determine that the alert-handshake control line ALERT_HAND is simultaneously driven by the slave devices 14A with higher priority. Thus, the controller 145B is configured to disable the pull-down circuit 150B to electrically separate the pull-down resistor Rs of the pull-down circuit 150B from the pull-up resistor Rp.

At time t7, since only the slave device 14A is configured to continuously drive the alert-handshake control line ALERT_HAND, the detected voltage value DET of the alert-handshake control line ALERT_HAND will eventually be the same as the drive voltage level VD_A. Specifically, when the slave devices 14A through 14D are configured to simultaneously drive the alert-handshake control line ALERT_HAND, according to the control method of FIG. 4, the slave device 14A having the highest priority is configured to obtain the control of the alert-handshake control line ALERT_HAND. Thus, the slave device 14A is configured to communicate with the master device 10 (e.g., performing interrupt requests). After completing communication with the master device 10, the slave device 14A is configured to disable the pull-down circuit 150A. Then, the alert-handshake control line ALERT_HAND rises from the drive voltage level VD_A to the power voltage level of the power supply VDD.

For each slave device 14 in the bus system 1, by comparing the detected voltage value DET of the alert-handshake control line ALERT_HAND from the alert handshake pin ALERT and its own driving voltage level VD, it is determined whether the alert-handshake control line ALERT_HAND is driven by the other slave device. Therefore, it is compatible with the original architecture without adding additional pins. In addition, by detecting/measuring the voltage of the alert-handshake control line ALERT_HAND, the user can know which one of the slave devices 14 currently drives the alert-handshake control line ALER-T_HAND, thus speeding up the debugging time. Furthermore, by assigning each slave device 14 to have a different drive voltage level VD, the priority order of each of the slave devices 14 for driving the alert-handshake control line ALERT_HAND can be determined.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An integrated circuit (IC), comprising:
a specific pin;
a pull-down circuit coupled to the specific pin, comprising a pull-down resistor corresponding to a driving voltage level and selectively coupling the pull-down resistor to the specific pin according to a control signal;
a voltage detector coupled to the specific pin, detecting the specific pin to obtain a detected voltage value; and
a controller, determining whether the detected voltage value is the same as the driving voltage level, so as to provide the control signal,
wherein when the detected voltage value is greater or less than the driving voltage level, the controller is configured to provide the control signal to the pull-down circuit, so that the pull-down resistor is electrically separated from the specific pin,
wherein when the detected voltage value is greater than the driving voltage level, the controller is configured to provide the control signal to the pull-down circuit, so as to electrically separate the pull-down resistor from the specific pin, and when the detected voltage value is less than the driving voltage level, the controller is configured to provide the control signal to the pull-down circuit, so as to electrically connect the pull-down resistor to the specific pin.

2. The IC as claimed in claim 1, wherein the IC is one of a plurality of slave devices electrically connected to a master device, and the specific pin is electrically connected to the specific pins of the other slave devices via an alert handshake control line, wherein the alert handshake control line is coupled to a power supply via a pull-up resistor.

3. The IC as claimed in claim 2, wherein when the detected voltage value is the same as the driving voltage level, the controller is configured to provide the control signal to the pull-down circuit to electrically connect the pull-down resistor to the specific pin, so as to drive the alert handshake control line via the specific pin.

4. A bus system, comprising:
a master device;
an enhanced serial peripheral interface (eSPI) bus; and
a plurality of slave devices electrically connected to the master device through the eSPI bus, wherein each of the slave devices comprises:
an alert handshake pin;
a pull-down circuit coupled to the alert handshake pin, comprising a pull-down resistor corresponding to a driving voltage level and selectively coupling the pull-down resistor to the alert handshake pin according to a control signal;
a voltage detector coupled to the alert handshake pin, detecting the alert handshake pin to obtain a detected voltage value; and a controller, determining whether the detected voltage value is the same as the driving voltage level, so as to provide the control signal, wherein in each of the slave devices, the alert handshake pin is electrically connected to the alert handshake pins of the other slave devices via an alert handshake control line, and the alert handshake control line is coupled to a power supply via a pull-up resistor;

wherein in a first slave device of the slave devices, when the detected voltage value is different than the driving voltage level, the controller is configured to determine that the pull-down resistor is coupled to the pull-down resistor of a second slave device of the slave devices via the alert handshake pin, wherein the slave device having the maximum voltage level of the driving voltage level has highest priority for driving the alert handshake control line, and in each of the slave devices, when the detected voltage value is greater than the driving voltage level, the controller is configured to provide the control signal to the pull-down circuit, so as to electrically connect the pull-down resistor to the alert handshake pin, and when the detected voltage value is less than the driving voltage level, the controller is configured to provide the control signal to the pull-down circuit, so as to electrically separate the pull-down resistor from the alert handshake pin.

5. The bus system as claimed in claim 4, wherein in the first slave device, when determining that the detected voltage value is the same as the driving voltage level, the controller is configured to determine that the pull-down resistor is not coupled to the pull-down resistor of the second slave device via the alert handshake pin.

6. A control method for controlling a first slave device of a plurality of slave devices in a bus system, wherein the bus system further comprises a pull-up resistor and a master device electrically connected to the slave devices through an enhanced serial peripheral interface (eSPI) bus, and a first alert handshake pin of the first slave device is coupled to a second alert handshake pin of a second slave device of the slave devices via an alert handshake control line, and the alert handshake control line is coupled to a power supply via a pull-up resistor, the control method comprising:

detecting the alert handshake control line to obtain a detected voltage value via the first alert handshake pin;

in response to an alert request of the first slave device, coupling a first pull-down resistor corresponding to a first driving voltage level in the first slave device to the first alert handshake pin when the detected voltage value is the same as a power voltage level of the power supply; and electrically separating the first pull-down resistor from the first alert handshake pin when the detected voltage value is greater or less than the first driving voltage level.

7. The control method as claimed in claim 6, wherein the step of electrically separating the first pull-down resistor from the first alert handshake pin when the detected voltage value is greater or less than the first driving voltage level further comprises:

determining that a second pull-down resistor corresponding to a second driving voltage level in the second slave device is electrically coupled to the alert handshake control line via the second alert handshake pin when the detected voltage value is greater or less than the first driving voltage level, wherein the second driving voltage level is different from the first driving voltage level.

* * * * *